United States Patent
Nogi et al.

(10) Patent No.: US 9,873,335 B2
(45) Date of Patent: Jan. 23, 2018

(54) ELECTRIC RAILCAR POWER FEEDING SYSTEM, POWER FEEDING DEVICE, AND POWER STORAGE DEVICE

(71) Applicant: Kabushiki Kaisha Toshiba, Minato-ku (JP)

(72) Inventors: Masayuki Nogi, Hachioji (JP); Nobuhiko Satake, Yokohama (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 36 days.

(21) Appl. No.: 14/451,701

(22) Filed: Aug. 5, 2014

(65) Prior Publication Data

US 2015/0045997 A1    Feb. 12, 2015

(30) Foreign Application Priority Data

Aug. 12, 2013  (JP) .................................. 2013-167820

(51) Int. Cl.
| | |
|---|---|
| *B60L 9/08* | (2006.01) |
| *B60M 3/06* | (2006.01) |
| *B60L 3/00* | (2006.01) |
| *B60M 3/02* | (2006.01) |

(52) U.S. Cl.
CPC .............. *B60L 9/08* (2013.01); *B60L 3/0092* (2013.01); *B60M 3/06* (2013.01); *B60L 2200/26* (2013.01); *B60M 3/02* (2013.01); *Y02T 30/00* (2013.01)

(58) Field of Classification Search
None
See application file for complete search history.

(56) References Cited

U.S. PATENT DOCUMENTS

| | | | |
|---|---|---|---|
| 8,737,104 B2 | 5/2014 | Kurushima et al. | |
| 2011/0043038 A1 | 2/2011 | Tsutsumi et al. | |
| 2013/0322132 A1* | 12/2013 | Wijekoon ............. | H02M 5/297 363/37 |
| 2014/0070770 A1 | 3/2014 | Nogi et al. | |

FOREIGN PATENT DOCUMENTS

| | | |
|---|---|---|
| EP | 1 538 020 A2 | 6/2005 |
| EP | 2 676 834 A1 | 12/2013 |
| JP | 2006-62489 A | 3/2006 |
| JP | 2008-22650 A | 1/2008 |

(Continued)

OTHER PUBLICATIONS

Extended Search Report dated Oct. 30, 2015 in European Patent application No. 14180226.4.

(Continued)

*Primary Examiner* — Rami Khatib
*Assistant Examiner* — Gerrad A Foster
(74) *Attorney, Agent, or Firm* — Oblon, McClelland, Maier & Neustadt, L.L.P.

(57) ABSTRACT

An electric railcar power feeding system in an embodiment includes a power storage device, a rectifier, and an emergency power supply. The power storage device is connected to a feeder line for an electric railcar. The rectifier converts alternating-current power of a first power system to direct-current power and supply the direct-current power for the feeder line. The emergency power supply supplies power of a second power system different from the first power system for the feeder line.

11 Claims, 5 Drawing Sheets

(56) References Cited

FOREIGN PATENT DOCUMENTS

| | | | |
|---|---|---|---|
| JP | 2010-11711 A | | 1/2010 |
| JP | 2010-130772 | | 6/2010 |
| JP | 2012105407 A | * | 5/2012 |
| JP | 2012-166646 | | 9/2012 |
| JP | 2013-18464 | | 1/2013 |
| WO | WO 2012/098632 A1 | | 7/2012 |
| WO | WO 2012/111679 A1 | | 8/2012 |

OTHER PUBLICATIONS

Office Action dated May 13, 2014 in Japanese Patent Application No. 2013-167820.
Office Action dated Jan. 13, 2015 in Japanese Patent Application No. 2013-167820.

* cited by examiner

ELECTRIC RAILCAR POWER FEEDING SYSTEM, POWER FEEDING DEVICE, AND POWER STORAGE DEVICE

CROSS-REFERENCE TO RELATED APPLICATION

This application is based upon and claims the benefit of priority from Japanese Patent Application No. 2013-167820, filed on Aug. 12, 2013; the entire contents of which are incorporated herein by reference.

FIELD

Embodiments described herein relate generally to an electric railcar power feeding system, a power feeding device, and a power storage device.

BACKGROUND

In a transportation system such as a railroad, a monorail or the like causing an electric railcar to travel by a direct-current feeding method, when a direct-current substation being the power supply source fails, the electric railcar that cannot receive power any longer becomes unable to travel in some case. Hence, to secure the power supply for traveling in the case of power failure or the like, there is suggested a technology of mounting a power storage device on the electric railcar so that the electric railcar travels by the power of the power storage device.

On the other hand, a technology of providing a power storage device on a feeder line side so as to move the electric railcar to the nearest station by supplying power from the power storage device to the feeder line when the alternating-current power supply cannot be obtained any longer, has been already practically used.

However, in the case of the former technology of mounting the power storage device on the electric railcar, the electric railcar of the monorail or the like cannot be said to have space enough to mount the power storage device thereon. Further, mounting the power storage device being a high-energy body on the electric railcar results in an increased risk such as fire. In particular, in the transportation system such as the monorail, there also occurs a risk of parts falling after reconstruction work for mounting the power storage device.

Further, in the case of the latter technology of providing the power storage device on the feeder line side, for example, a power storage device of an overhead contact line direct-coupled type generally needs to have a larger number of cells in series, resulting in an increase in size of the whole power storage device and in cost. Further, in consideration of the voltage drop in the feeder line, movement of vehicle for a long distance is difficult.

Note that in the case of a power storage device not of the overhead contact line direct-coupled type but of supplying power to the feeder line side via a converter, more power is consumed due to switching loss of the converter. Accordingly, the power storage device in this case quickly decreases in charge amount, and therefore it is impossible to obtain sufficient supply of power at power failure or the like. Hence, it is conceivable to make the power storage device have a large capacity, but there occurs problem in terms of cost because of the need to arrange many power storage devices with large capacity in a distributed manner.

Here, especially when the electric railcar of the monorail type stops between stations, it is extremely difficult, for example, for passengers to walk to escape to the near station. Therefore, a further improvement in the power feeding technology is required also in terms of safety.

DETAILED DESCRIPTION

An electric railcar power feeding system in an embodiment includes a power storage device, a rectifier, and an emergency power supply. The power storage device is connected to a feeder line for an electric railcar. The rectifier converts alternating-current power of a first power system to direct-current power and supply the direct-current power for the feeder line. The emergency power supply supplies power of a second power system different from the first power system for the feeder line.

Hereinafter, embodiments will be described based on the drawings.

First Embodiment

Figure 1:
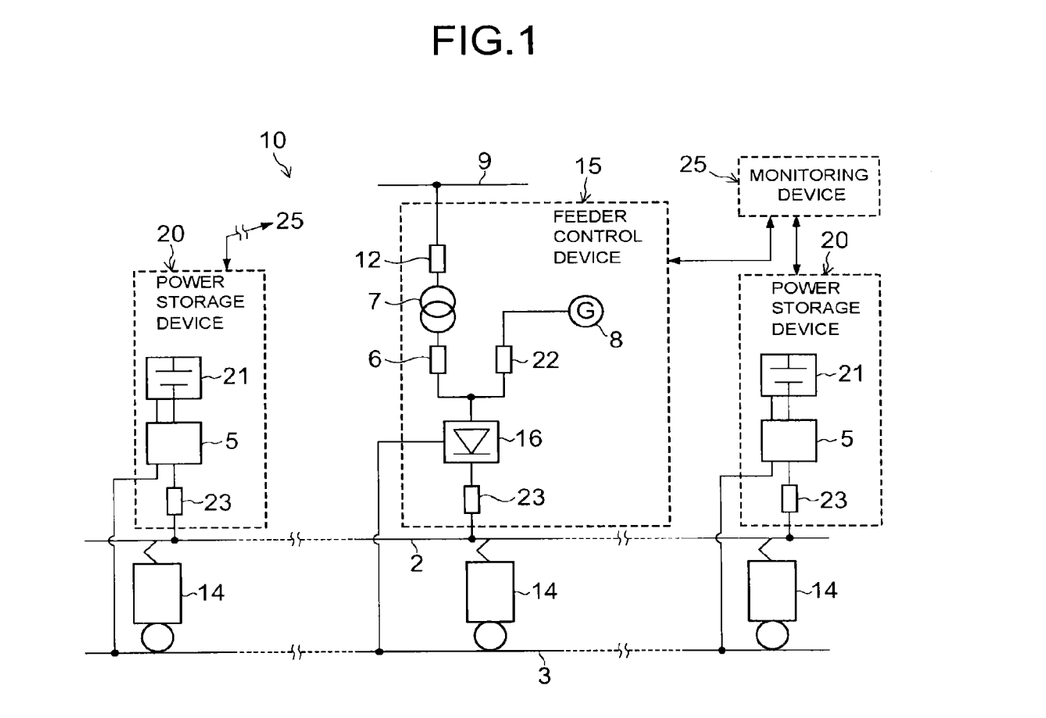
FIG. 1 is a block diagram illustrating the configuration of an electric railcar power feeding system according to a first embodiment.

As illustrated in FIG. 1, an electric railcar power feeding system 10 in this embodiment is a power feeding system of a direct-current feeding type that feeds direct-current power to electric railcars 14 via a feeder line 2 of a railroad, a monorail and so on. The electric railcar power feeding system 10 includes a feeder control device (a power feeding device) 15, power storage devices 20, and a monitoring device 25 that collectively controls the feeder control device 15 and the power storage devices 20 as illustrated in FIG. 1.

The feeder control device 15 is installed, for example, every 5 km or at every station of the railroad, monorail and so on. As illustrated in FIG. 1, the feeder control device 15 mainly includes an alternating-current circuit breaker 12, a transformer 7, a normal power supply circuit breaker 6, an emergency power supply 8 (a power supply of a second power system), an emergency power supply circuit breaker 22, a rectifier 16, a direct-current circuit breaker 23 as feeding facilities.

The alternating-current circuit breaker 12 electrically connects or disconnects an alternating-current power supply 9 being a commercial power supply and the transformer 7 to/from each other. The aforementioned alternating-current power supply 9 (an alternating-current power supply of a first power system) is a normal power supply of an alternating-current system for direct-current feeding. The transformer 7 varies the voltage of the alternating-current power supply 9. The normal power supply circuit breaker 6 electrically connects or disconnects the transformer 7 and the rectifier 16 to/from each other.

The emergency power supply 8 is, for example, a gas turbine generator or a diesel generator. The emergency power supply 8 supplies power of the second power system different from the first power system (an alternating-current power of the alternating-current power supply 9) for the feeder line 2. The emergency power supply circuit breaker 22 electrically connects or disconnects the emergency power supply 8 and the rectifier 16 to/from each other. Note that a transformer for voltage regulation may be separately provided at the stage subsequent to the emergency power supply 8 such that the emergency power supply 8 and the rectifier 16 are connected to each other via the separately provided transformer and the emergency power supply circuit breaker 22.

The rectifier 16 is, for example, a diode rectifier or a PWM converter, and is an AC/DC converter that converts alternating current to direct current. The rectifier 16 converts the alternating-current power of the first power system (the alternating-current power of the alternating-current power supply 9) to direct-current power and supply the direct-current power for the feeder line 2. The direct-current circuit breaker 23 in the feeder control device 15 electrically connects or disconnects the rectifier 16 and the feeder line 2 to/from each other. Note that those instruments in the feeder control device 15 do not necessarily needs to be collectively arranged in the same device.

The electric railcars 14 travel by receiving the direct-current power via the feeder line 2 from the feeder control device 15 side. All electric rolling stocks, which travel using electricity as a driving source such as vehicles used for the monorail and vehicles used for the railroad, correspond to the electric railcars 14. A return feeder 3 is a conductor through which a return current flows and, for example, a rail in the case of the conventional railroad, has such function. For the transportation system that travels with rubber wheels and for part of subway, a dedicated conductor through which the return current flows is installed as the return feeder 3.

Figure 2:
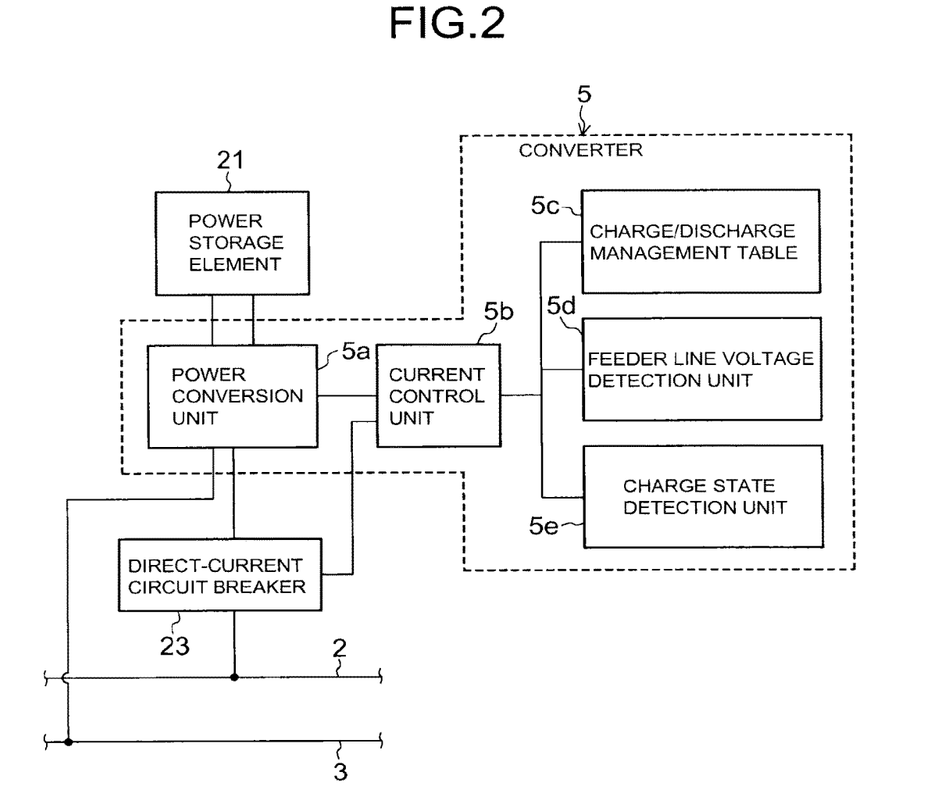
FIG. 2 is a block diagram illustrating the configuration of a converter in a power storage device included in the electric railcar power feeding system in FIG. 1.

On the other hand, the power storage devices 20 are arranged, for example, every 3 km in a distributed manner, and installed at a distance from the installation position of the feeder control device 15. As illustrated in FIG. 1, FIG. 2, the power storage device 20 is connected to the feeder line 2 for an electric railcar. Further, the power storage device 20 is connected to the return feeder 3. The power storage device 20 includes a power storage element 21, a converter 5, and a direct-current circuit breaker 23. The power storage element 21 is, for example, a storage battery such as a lithium-ion battery, a nickel-metal hydride battery, or a lead-acid battery, or an energy storage element such as an electric double layer capacitor, or a flywheel.

The power storage device 20 performs charge and discharge according to rise and drop in feeder line voltage respectively as will be described later. The power storage device 20 performs discharge when the value of the feeder line voltage is equal to or less than a discharge threshold (A1 to A2) that varies according to the state of charge (SOC) of the power storage device 20 as illustrated, for example, in FIG. 3. Further, the power storage device 20 performs charge when the value of the feeder line voltage is equal to or greater than a charge threshold (B1 to B2) that varies according to the state of charge (SOC) of the power storage device 20. Further, the power storage device 20 stops charge/discharge when the value of the feeder line voltage is greater than the discharge threshold A1 and less than the charge threshold B1, or stops charge/discharge when the state that the value of the feeder line voltage is greater than the discharge threshold A1 and less than the charge threshold B1 continues for a predetermined period. In other words, a voltage range S of the feeder line voltage in FIG. 3 indicates a voltage range where the power storage device 20 does not perform charge/discharge (a voltage range where the converter 5 is stopped for gate block).

Note that the power storage device 20 may be configured to stop charge/discharge when the value of current flowing through the feeder line 2 or the value of the power is greater than a discharge threshold corresponding to the value of the current or the value of the power and less than the charge threshold. Instead of this, the power storage device 20 may also be configured to stop charge/discharge when the state that the value of current flowing through the feeder line 2 or the value of the power is greater than the discharge threshold corresponding to the value of the current or the value of the power and less than the charge threshold continues for a predetermined period.

The direct-current circuit breaker 23 in the power storage device 20 electrically connects or disconnects the converter 5 and the feeder line 2 to/from each other. The converter 5 sends/receive power to/from the feeder line 2 and the power storage element 21. The converter 5 is configured to have a function of a DC/DC converter if the power storage element 21 is, for example, a storage battery or capacitor, and to have a function of an inverter that realizes DC/AC conversion if the power storage element 21 is, for example, a flywheel.

Here, the monitoring device 25 acquires, for example, the voltage of the feeder line 2 and, according to an input operation by an operator based on the acquired feeder line voltage, controls the operations of the direct-current circuit breaker 23, the alternating-current circuit breaker 12, the normal power supply circuit breaker 6, the emergency power supply 8, the emergency power supply circuit breaker 22, and the direct-current circuit breaker 23 in the feeder control device 15, and the direct-current circuit breaker 23 and the converter 5 in the power storage device 20.

Further, the converter 5 will be described in detail. The converter 5 (a charge/discharge control unit) controls the charge and the discharge of the power storage element 21 according to rise and drop in the voltage of the feeder line 2. As illustrated in FIG. 2, the converter 5 includes a power conversion unit 5a, a current control unit 5b, a charge/discharge management table 5c, a feeder line voltage detection unit 5d, and a charge state detection unit 5e.

The power conversion unit 5a is configured as a step-up/down chopper circuit (buck-boost Converter) or the like that gate-drives, for example, a switching element, and controls the charge/discharge operation of the power storage element 21. An example of the element to be applied to the power conversion unit 5a is, for example, a self-arc-extinguishing element such as an IGBT (Insulated Gate Bipolar Transistor), and the charge/discharge operation of the power storage element 21 is controlled by driving this kind of element in PWM (Pulse Width Modulation).

The current control unit 5b controls the operation of the direct-current circuit breaker 23 in the power storage device 20, while the power conversion unit 5a controls the charge/discharge current (the charge current and the discharge current) that inputs/outputs from/to the feeder line 2 to/from the power storage element 21. The feeder line voltage detection unit 5d detects the feeder line voltage of the feeder line 2. The charge state detection unit 5e detects the state of charge (SOC) of the power storage element 21 as a charge rate [%].

Figure 3:
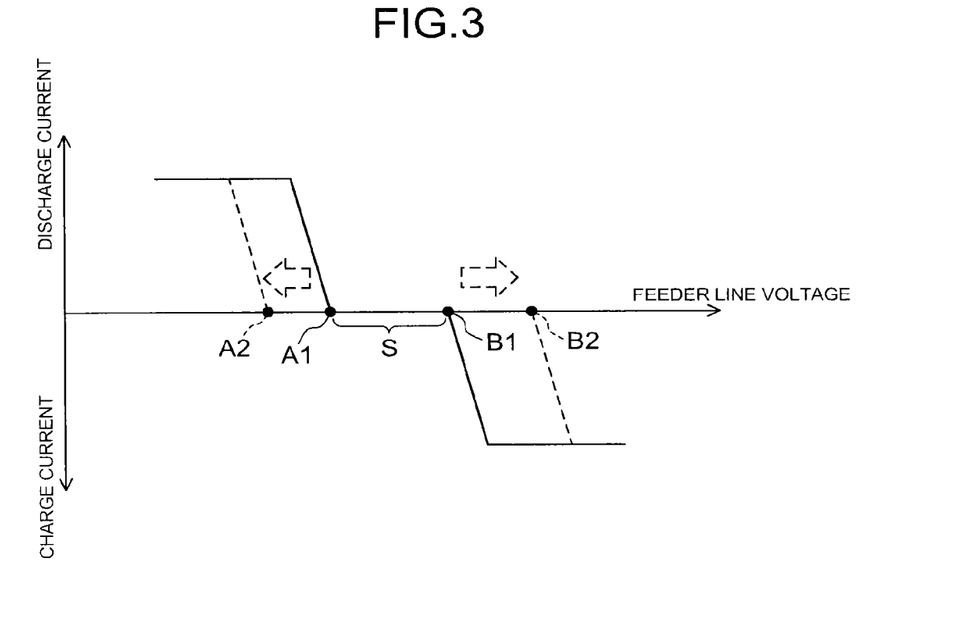
FIG. 3 is a chart illustrating the relation between a charge/discharge current by the power storage device in FIG. 2 and a feeder line voltage.
Figure 4:
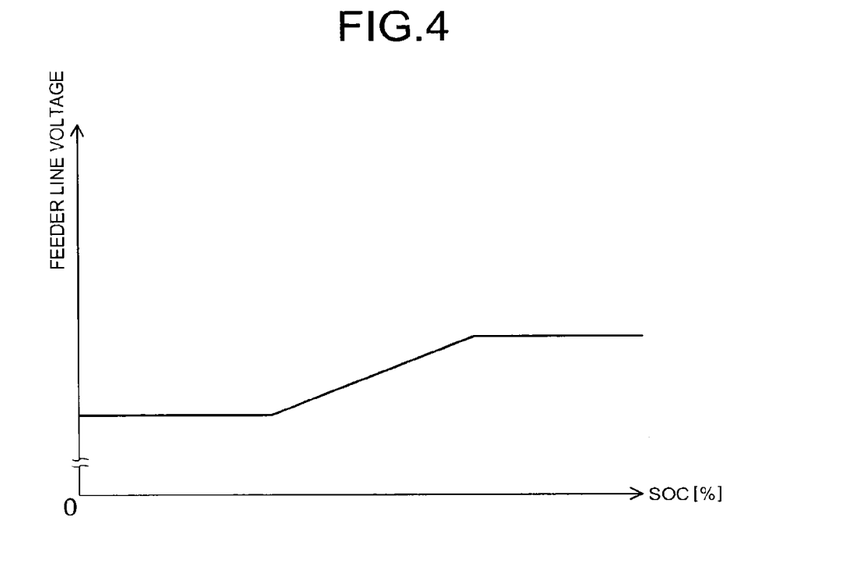
FIG. 4 is a chart exemplifying the content of a charge/discharge management table included in the converter in the power storage device in FIG. 2.

The charge/discharge management table 5c stores the correspondence between the feeder line voltage and the state of charge (SOC) of the power storage element 21, as charge/discharge characteristics, in order to decide the discharge threshold voltage (A1 to A2) and the charge threshold voltage (B1 to B2) according to the feeder line voltage as illustrated in FIG. 3, FIG. 4. The charge/discharge management table 5c stores, for example, two kinds of charge/discharge characteristics different according to the power failure time of the alternating-current power supply 9 and the normal time when the power can be supplied from the alternating-current power supply 9.

More specifically, the current control unit 5b varies the discharge threshold voltage and the charge threshold voltage on the basis of the detected feeder line voltage, the state of charge of the power storage element 21, and the charge/discharge characteristics stored in the charge/discharge management table 5c as illustrated in FIG. 3, FIG. 4. The current control unit 5b thereby adjusts the charge/discharge current of the power storage element 21 by the power conversion unit 5a.

Here, a method of causing the electric railcar power feeding system 10 to substantially independently operate will be described. First, in the case of normal feeding state in which the alternating-current power supply 9 is available, the power storage device 20 performs charge/discharge according to the feeder line voltage. In more detail, the power storage device 20 performs discharge when absorbing excessive regenerative power or when the feeder line voltage decreases, to stabilize the feeder line voltage. In this event, the emergency power supply circuit breaker 22 in the feeder control device 15 is kept open. The alternating-current power supply 9 passes through the transformer 7 and is converted to direct-current power at the rectifier 16, and is then supplied to the electric railcars 14 via the feeder line 2.

In the case where the alternating-current power supply 9 fails in this situation and the alternating-current power supply 9 is separated from a feeder system to cause the electric railcar power feeding system 10 independently operate, the monitoring device 25 controls the alternating-current circuit breaker 12 and the normal power supply circuit breaker 6 to open the direct-current circuit breaker 23 in the feeder control device 15. In this event, the direct-current circuit breakers 23 in the power storage devices 20 may be opened in cooperation with the operation of the feeder control device 15 to stop the power storage devices 20.

On the other hand, the monitoring device 25 performs controls to continue the charge/discharge operation without opening the direct-current circuit breakers 23 in the power storage devices 20, thereby making it possible not to stop the electric railcars 14 but to operate the electric railcars 14, for example, to the nearest stations. Further, a low-loss device such as, for example, an SiC (Silicon Carbide) power device that is a high-efficiency device is applied to the power storage device 20 so as to avoid a decrease in charge rate of the power storage element due to continuous generation of switching loss of the converter 5 and an increase in storage capacity in consideration of the decrease, thereby simplifying the facilities.

On the other hand, a method of causing the electric railcar power feeding system 10 to substantially independently operate, in the case where the direct-current circuit breaker 23 in the power storage device 20 is opened to separate the power storage device 20 from the feeder line 2 to cause power failure in the whole feeder system, will be described.

First, the monitoring device 25 performs control to activate the emergency power supply 8 and turn on (close) the emergency power supply circuit breaker 22. Subsequently, the direct-current circuit breaker 23 in the feeder control device 15 is turned on (closed) to supply the direct-current power to the feeder line 2. Further, the power storage device 20 is activated to turn on the direct-current circuit breaker 23 in the power storage device 20 to cause the power storage device 20 to cooperate with the feeder system.

In this event, the power storage device 20 has characteristics of discharging when the feeder line voltage is decreased to be lower than the discharge threshold voltage as illustrated in FIG. 3. On the other hand, the power storage device 20 gate-blocks the converter 5 when not discharging, to stop the power conversion operation by the converter 5. In this case, the power storage device 20 may gate-block it upon detecting the fact that a predetermined time of a predetermined output value has elapsed or may gate-block it under the condition that the state of charge (SOC) reaches within a predetermined rage.

Further, the power storage device 20 has characteristics of charging when the feeder line voltage rises to be higher than the charge threshold voltage as illustrated in FIG. 3. Further, the above-described charge threshold voltage has characteristics of decreasing as the state of charge (SOC) of the power storage element 21 becomes lower, whereas increasing as the state of charge becomes higher.

Here, the electric railcar power feeding system is caused to independently operate simply by making the power storage device cooperate with the feeder system using a converter in the prior art. Therefore, in the prior art, when the feeder line voltage is tried to be maintained, the state of charge of the power storage device decreases due to switching loss of the converter, thus failing to secure energy to cause electric railcars to travel. Accordingly, to activate, for example, the electric railcars in a route all at once and move them to the nearest stations, it is necessary to increase the output of the power storage device itself according to the load in the prior art, resulting in increases in size of the power storage device and in cost.

Hence, it is also possible to directly connect the power storage device to the feeder system without using the converter, but it is necessary to increase the number of series of cells in the power storage device. Therefore, in the prior art, the size of the power storage element increases and many power storage elements need to be arranged in a distributed manner in the feeder system to respond to the drop in the feeder line voltage, which is not economical. Further, in the case where the power storage element is directly connected to the feeder system without using the converter, the charge/discharge cannot be controlled, but the charge/discharge of the power storage element is performed at all times, causing charge/discharge loss. This results in an increase in power loss of the feeder system.

On the other hand, the electric railcar power feeding system 10 in this embodiment makes it possible to supply, for example, the power of the emergency power supply 8 to the feeder line 2 via the diode rectifier, for a plurality of electric railcars 14 existing in the feeder system during the independent operation. In other words, the electric railcar power feeding system 10 can generate power, for example, by a fuel system employing the emergency power supply 8 and therefore can supply power for a longer period than by the power storage element. Further, in the case of employing the diode rectifier with a high conversion efficiency as the rectifier, the above-described switching loss can be decreased. This makes it possible to supply power to an accessory system of the electric railcar 14, for example, an air conditioner and illumination, and to continue the power supply to the accessory system for a long period until the electric railcar 14 reaches, for example, the nearest station by the independent operation.

Here, in the case where the electric railcar 14 travels to the nearest station, if the electric railcar 14 exists near the feeder control device 15, the feeder voltage drop hardly occurs because of low feeder circuit resistance, so that the movement of the electric railcar 14 is considered to be relatively easy. However, if the electric railcar 14 exists apart from the feeder control device 15, the feeder voltage drop is considered to be large because of high feeder circuit resistance.

Hence, in the electric railcar power feeding system 10 in this embodiment, the power storage devices 20 arranged in a distributed manner are employed. The power storage device 20 normally charges/discharges according to the powering and regeneration of the electric railcar and therefore does not need to have a large power storage capacity, and a power storage element with small power storage capacity can be employed therefor. Further, the power storage devices 20 with small power storage capacity are installed in a distributed manner and discharge only when the feeder voltage greatly drops, and can thereby suppress the decrease in the feeder voltage. In this event, the discharge threshold voltage is set to equal to or lower than a no-load delivery voltage of the rectifier when the emergency power supply is used.

Further, in the electric railcar power feeding system 10, the main power is supplied from the feeder control device 15 side, thus making it possible to operate the power storage device 20 specialized for countermeasure of the voltage drop in the feeder line. Thus, in the electric railcar power feeding system 10, the power storage capacity of the power storage element 21 can be decreased, and the switching loss of the converter 5 can be suppressed by gate block of the converter 5 at the time when charge/discharge is not performed.

Further, the electric railcar power feeding system 10 can charge the power generated by the emergency power supply 8 at the time when the electric railcar 14 does not perform powering operation due to the decrease in the charge threshold voltage when the state of charge of the power storage device 20 is decreased, and thereby can restore the state of charge (SOC) of the power storage device 20.

Furthermore, the electric railcar power feeding system 10 can supply power from the feeder control device 15 side for a small load capacity such as an accessory load of the electric railcar 14, whereas supply power from the power storage device 20 side when the feeder line voltage (trolley voltage) is decreased due to a large powering load. This facilitates the maintenance of the feeder line voltage, and thereby makes it possible to decrease the power storage capacity of the power storage element and decrease the switching loss of the power storage device in the independent operation, resulting in simplification of the facilities for power feeding. As has been described, according to the electric railcar power feeding system 10 in this embodiment, it becomes possible to supply necessary power to the feeder line side even in emergency such as power failure, by using relatively simple facilities.

Second Embodiment

Next, a second embodiment will be described based on FIG. 5. Note that components which are the same as those in the first embodiment illustrated in FIG. 1 are denoted by the same reference numerals in FIG. 5, and overlapped description thereof will be omitted.

Figure 5:
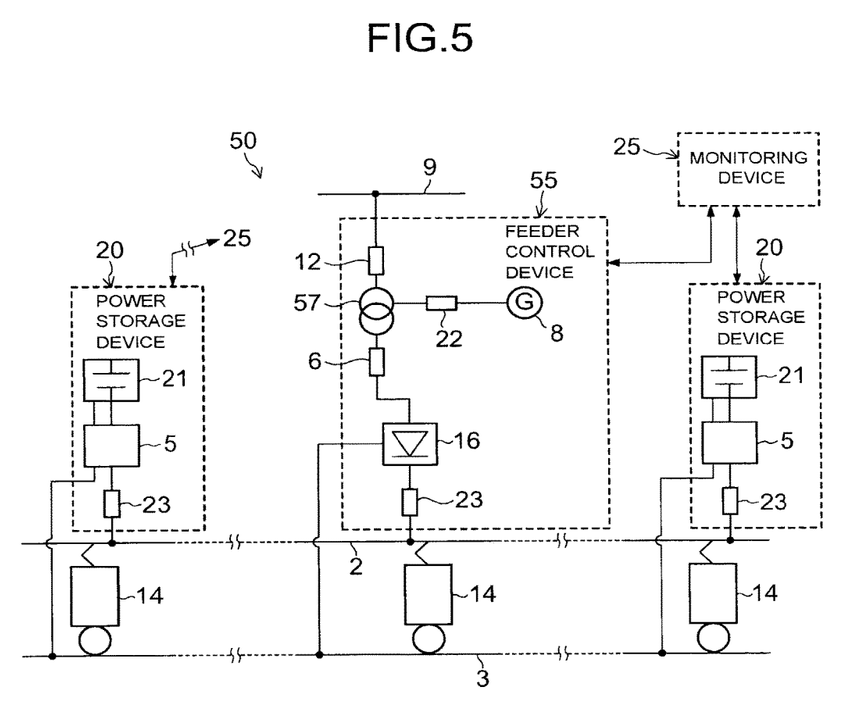
FIG. 5 is a block diagram illustrating the configuration of an electric railcar power feeding system according to a second embodiment.

As illustrated in FIG. 5, an electric railcar power feeding system 50 in this embodiment includes a feeder control device 55 in place of the feeder control device 15 included in the electric railcar power feeding system 10 according to the first embodiment. The feeder control device 55 includes a transformer 57 in place of the transformer 7 included in the feeder control device 15. The electric railcar power feeding system 50 realizes voltage transformation of the alternating-current power supply 9 and voltage transformation of the emergency power supply 8 using one transformer 57 in common for reduction of facilities. The transformer 57 transforms the alternating-current power of the alternating-current power supply 9 (the alternating-current power of the first power system) or the power of the emergency power supply 8 (the power of the second power system) so as to output the transformed power for the rectifier 16.

More specifically, the transformer 57 includes a tap with a transformation ratio according to the alternating-current power supply 9 and a tap with a transformation ratio according to the emergency power supply 8. The transformer 57 employs the latter tap in the independent operation to output the power of the emergency power supply 8 to the rectifier 16 side as illustrated in FIG. 5. Therefore, according to the electric railcar power feeding system 50, common use of the transformer 57 enables reduction of facilities and cost. Further, the electric railcar power feeding system 50 can perform the voltage transformation of the emergency power supply 8, which cannot be performed by the electric railcar power feeding system 10 in the first embodiment, thereby broadening the options of the employable emergency power supply 8.

Third Embodiment

Figure 6:
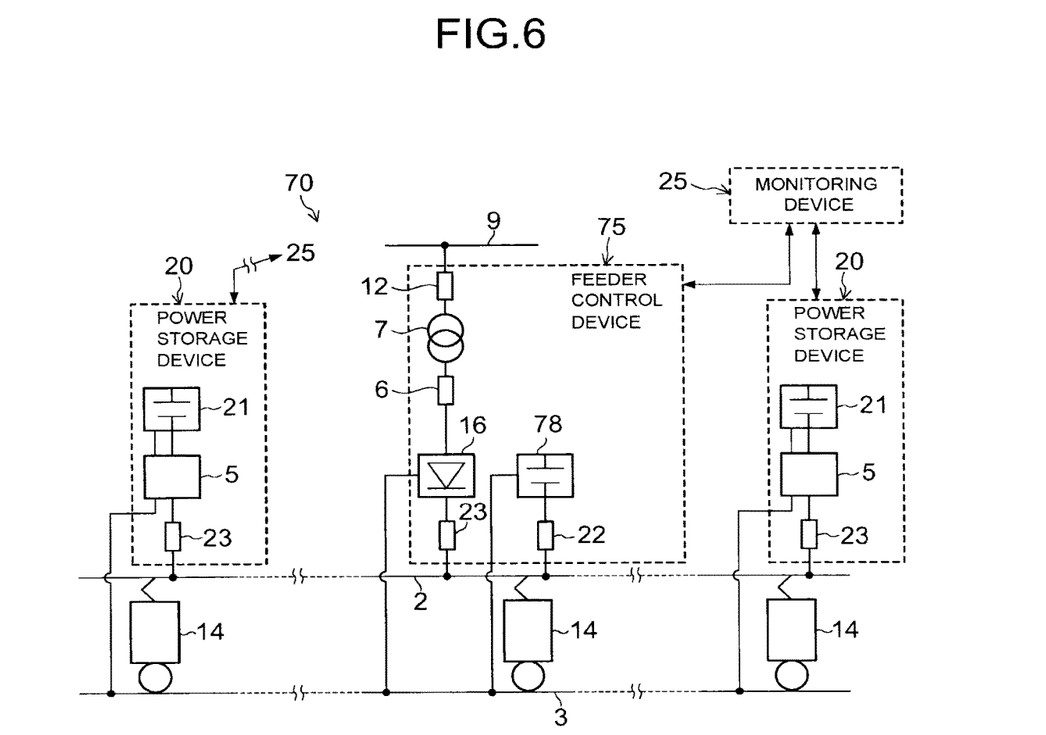
FIG. 6 is a block diagram illustrating the configuration of an electric railcar power feeding system according to a third embodiment.

Next, a third embodiment will be described based on FIG. 6. Note that components which are the same as those in the first embodiment illustrated in FIG. 1 are denoted by the same reference numerals in FIG. 6, and overlapped description thereof will be omitted.

An electric railcar power feeding system 70 according to this embodiment includes a feeder control device 75 in place of the feeder control device 15 included in the electric railcar power feeding system 10 according to the first embodiment. The feeder control device 75 includes an emergency power supply 78 in place of the emergency power supply 8 included in the feeder control device 15. The transformer 7 and the rectifier 16 are opened by the direct-current circuit breaker 23 in the feeder control device 75 when the alternating-current power supply 9 fails, as in the case of the first embodiment.

The emergency power supply 78 is connected to the feeder line 2 with no transformer intervening between them and is, for example, a power storage element composed of the number of cells in series corresponding to a DC 1500 V. Accordingly, the battery capacity of the emergency power supply 78 is necessarily large. The emergency power supply 78 composed of the power storage element can be made to operate in place of the emergency power supply 8 is in the first embodiment.

More specifically, it becomes possible that when the alternating-current power supply 9 fails, the emergency power supply 78 supplies the main feeder power to the feeder line 2, whereas the power storage device 20 smaller in power storage capacity than the emergency power supply 78 performs compensation for the drop in the feeder line voltage (trolley voltage). This makes it possible to reduce the facilities of the electric railcar power feeding system 70 including the feeder control device 75. Note that to prevent the situation that discharge is started immediately after the failure of the alternating-current system, the emergency power supply 78 having the power storage element may be paralleled-off once from the feeder line 2 when the alternating-current power supply 9 fails.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electric railcar power feeding system, comprising:
    a feeder control device including:
        a transformer including a first tap and a second tap, the first tap being connected to an alternating-current power supply configured to supply a first alternating-current power of first voltage,
        an emergency power supply including an alternating-current generator connected to the second tap, the emergency power supply being activated and supplying second alternating-current power of a second voltage when the alternating-current power supply fails, the second alternating-current power being generated by the alternating-current generator, the second voltage being different from the first voltage, and
        a rectifier configured to receive one of the first alternating current power and the second alternating current power transformed by the transformer, and to convert one of the transformed first alternating-current power and the transformed second alternating-current power into direct-current power to supply the direct-current power to a feeder line; and
    a power storage device connected to the feeder line and spaced away from the feeder control device at a distance, the power storage device being configured to store the direct-current power.

2. The electric railcar power feeding system according to claim 1,
    wherein the power storage device performs charge and discharge according to rise and drop in feeder line voltage respectively.

3. The electric railcar power feeding system according to claim 2,
    wherein the power storage device performs discharge when a value of the feeder line voltage is equal to or less than a discharge threshold that varies according to a state of charge of the power storage device.

4. The electric railcar power feeding system according to claim 2,
    wherein the power storage device performs charge when a value of the feeder line voltage is equal to or greater than a charge threshold that varies according to a state of charge of the power storage device.

5. The electric railcar power feeding system according to claim 2,
    wherein the power storage device stops charge/discharge when the value of the feeder line voltage is greater than a discharge threshold and less than a charge threshold, or stops charge/discharge when a state that the value of the feeder line voltage is greater than the discharge threshold and less than the charge threshold continues for a predetermined period.

6. The electric railcar power feeding system according to claim 2,
    wherein the power storage device stops charge/discharge when a value of current flowing through the feeder line or a value of the power is greater than a discharge threshold corresponding to the value of the current or the value of the power and less than a charge threshold, or stops charge/discharge when a state that the value of current flowing through the feeder line or the value of the power is greater than the discharge threshold corresponding to the value of the current or the value of the power and less than the charge threshold continues for a predetermined period.

7. The electric railcar power feeding system according to claim 1,
    wherein the power storage device comprises a power storage element and a step-up/down chopper circuit, and
    wherein the power storage element is an energy storage element.

8. The electric railcar power feeding system according to claim 7,
    wherein an SiC power device is applied to the step-up/down chopper circuit.

9. The electric railcar power feeding system according to claim 1,
    wherein the emergency power supply comprises a power storage element.

10. The electric railcar power feeding system according to claim 9,
    wherein the emergency power supply comprising the power storage element is paralleled-off once from the feeder line when the alternating-current power supply fails.

11. The electric railcar power feeding system according to claim 1,
    wherein the power storage device includes:
        a power storage element configured to store electric power from the feeder line and to supply the stored electric power to the feeder line,
        a power conversion unit configured to convert electric power between the power storage element and the feeder line,
        a direct-current circuit breaker connecting the power conversion unit with the feeder line,
        a feeder line voltage detection unit configured to detect a voltage of the feeder line,
        a charge state detection unit configured to detect a charge state of the power storage element,
        a charge/discharge management table storing a correspondence between a voltage of the feeder line and a charge state of the power storage element,
        a current control unit configured to control a power conversion unit and the direct-current circuit breaker to vary a charge threshold voltage and a discharge threshold voltage of the power storage element based on the voltage detected by the feeder line voltage detection unit, the charge state detected by the charge state detection unit, and the correspondence stored in the charge/discharge management table.

* * * * *